United States Patent Office 2,850,308
Patented Sept. 2, 1958

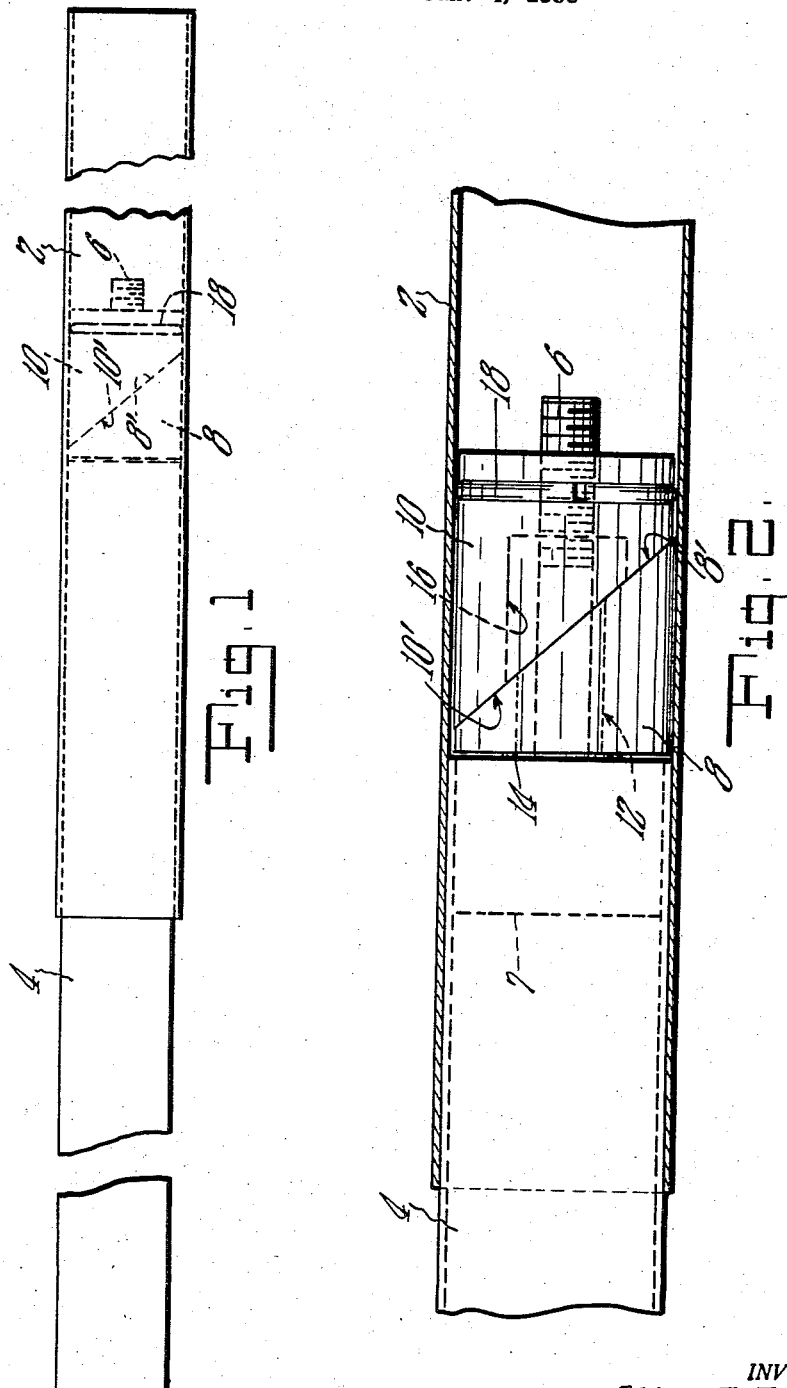

2,850,308

LOCK FOR TELESCOPING TUBE

Alfred L. Le Febvre, West Suffield, Conn., and Alvin O. Johnson, Westfield, and Douglas M. Small, Springfield, Mass., assignors to Stanley Home Products, Inc., Easthampton, Mass., a corporation of Massachusetts Application January 4, 1956, Serial No. 557,328

1 Claim. (Cl. 287—58)

This invention relates to new and useful improvements in a lock mechanism for telescoping tubes.

The principal object of the invention is directed to the provision of a lock mechanism for telescoping tubes whereby relatively telescopic tubes may be releasably secured in longitudinally adjusted positions.

The invention is adapted for various uses, but is particularly adapted to use on tubular handles of such implements as brooms, mops and the like where it is desired to provide handles of various lengths or to ship and/or store handles in shorter lengths than when in use.

Although the invention will be described and illustrated herein with particular reference to tubular handles, it should be appreciated that its utility and application extend beyond the particular type of handle illustrated and comprehend the useful and novel features set forth when combined with legs or handles or supporting members of various types and for various purposes.

In the drawings:

Fig. 1 is a plan view of telescoping tubular members having the lock mechanism of the invention associated therewith; and Fig. 2 is an enlarged longitudinal sectional view through one tubular member having the other tubular member therein in locked position.

Referring now to the drawings in detail, the novel features of the invention will be fully described.

Outer and inner tubular members are shown at 2 and 4 respectively as arranged so that they are relatively slidable into and out of locked relation.

Said tubular members may represent the sections of an elongated handle for a broom, mop or the like, but the invention is adapted for telescoping tubes for other purposes as well.

A threaded stem 6 extends from the inner end of the inner tube 4 and may be fixed thereto in any well known manner. For illustrative purposes, the stem 6 is secured to or is a part of a plug 7 fixed in the end of the tube 4. Inner and outer lock members 8 and 10 respectively are provided. The outer lock member 10 is in threaded engagement with the stem 6.

The inner adjacent end faces 8' and 10' of lock members 8 and 10 respectively are angularly disposed relative to the longitudinal axes of the tubes, as shown.

The inner member 8 is provided with a bore 12 through which the stem 6 extends, said bore being larger than the stem 6 to permit movements of the member 8 transversely to the axes of the tubes.

The rear end of member 8 is provided with a boss 14 of less diameter than that of said member 8 to facilitate the sliding of the end of the member 8 on the adjacent face of the plug 7.

The lock member 10 is provided with an enlarged bore 16 and the outer end portion of said member 10 is in threaded engagement with the stem 6, as stated.

Lock member 10 is provided with a metallic split ring 18 seated in a suitable annular groove formed therein adjacent the forward or outer end thereof.

The locking members are shown in locking position and are formed so that, in unlocked relation, there is slight clearance between the circumference of the members and the inner side of the wall of tube 2. This is so that the inner tube 4 and the lock mechanism may be moved freely axially of the tube 2.

The friction ring 18 is formed to engage the inner wall of the tube 2 with sufficient frictional action as to prevent unwanted rotation of the lock member 10 in said tube 2.

To lock the tubes against relative axial movement, as shown, the tube 4 is rotated in one direction relative to tube 2, so that the stem 6 urges the lock member 10 towards the end of tube 4. This movement of member 10, through the adjacent faces of the lock members, causes the member 8 to be displaced transversely so that it binds against the inner wall of tube 2, as shown.

To unlock the tubes, the tube 4 is rotated in an opposite direction relative to the tube 2 so that the stem 6 moves member 10 away from the end of tube 4, releasing the inner lock to the end that it does not bind against the wall of tube 2.

In the unlocked relation of the parts, the tubes are readily slidable relative to one another. In relative rotation of the tubes to lock or unlock them, the friction ring 18 acts to retard rotation of the member 10 in the tube 2, so that said member is moved towards or away from the end of tube 4 by the stem 6.

The present embodiments of this invention are to be considered merely as being illustrative and not as being restrictive. All modifications and variations as fall within the meaning and purview and range of equivalency of the appended claim are intended to be embraced therein.

What it is desired to claim and secure by Letters Patent of the United States is:

The combination with an adjustable handle having the inner end of an elongated tubular inner member rotatable and slidable in an end of an elongated tubular outer member of mechanism for releasably locking said members in positions of longitudinal adjustment comprising, a plug fixed in the inner end of said inner member having an elongated stem extending outwardly therefrom into the end of said outer member, said stem provided with screw threads on its outer extremity, a boss on the outer end of said plug around the inner end of said stem, an inner lock member on said stem within said outer member having an inner face in engagement with said boss and an outer periphery of relatively less diameter than the inside diameter of said outer member, said inner lock member being loose on said stem for sideways displacement thereof relative to the longitudinal axis of said stem for engagement of the periphery thereof with the outer member, an outer lock member around said stem outwardly of said inner lock member having an outer end portion in threaded engagement with the threaded extremity of said stem and an outer periphery of relatively less diameter than the inner diameter of the outer member, said outer lock member provided adjacent the outer end thereof with an annular groove therearound having a friction ring in said groove frictionally engaging the outer member to resist relative movements of said outer lock member in the outer member, adjacent end faces of said lock members being complemental and disposed obliquely relative to the longitudinal axis of said stem whereby as said inner and outer members are relatively rotated in one direction the outer lock member is drawn axially towards the inner lock member by the threaded extremity of the stem and is held against rotation by frictional engagement of said ring with the outer member so that by the oblique faces of the lock members the inner lock member is displaced sideways to engage the periphery thereof with said inner member.

References Cited in the file of this patent

UNITED STATES PATENTS

| | | |
|---|---|---|
| 1,493,063 | Blaine | May 6, 1924 |
| 2,367,196 | Butler | Jan. 16, 1945 |
| 2,490,369 | Neuwirth | Dec. 6, 1949 |
| 2,542,967 | Waechter | Feb. 20, 1951 |

FOREIGN PATENTS

| | | |
|---|---|---|
| 267,177 | Switzerland | June 1, 1950 |
| 143,837 | Sweden | Jan. 26, 1954 |